Sept. 1, 1970          E. UHLMANN          3,526,779

DC POWER TRANSMISSION SYSTEM WITH STABILIZING EFFECT

Filed Feb. 13, 1969          3 Sheets-Sheet 1

INVENTOR.
ERICH UHLMANN
BY
Jennings Bailey Jr

United States Patent Office 3,526,779
Patented Sept. 1, 1970

3,526,779
DC POWER TRANSMISSION SYSTEM
WITH STABILIZING EFFECT
Erich Uhlmann, Ludvika, Sweden, assignor to Allmänna
Svenska Elektriska Aktiebolaget, Vasteras, Sweden, a
corporation of Sweden
Filed Feb. 13, 1969, Ser. No. 799,016
Claims priority, application Sweden, Feb. 15, 1968,
1,959/68
Int. Cl. H02j 3/36
U.S. Cl. 307—20    7 Claims

ABSTRACT OF THE DISCLOSURE

Two AC networks are interconnected by a DC power transmission system controlled from a regulator with respect to a certain desired operating magnitude. An additional control order is supplied to said regulator in order to stabilize the conditions in a first of said AC networks. Said additional control order is derived from said first AC network as the sum of two signals depending on the frequency deviation at two separate points of said network. Each of said two signals is derived from the frequency deviation in the proper point according to a function $$F = a + \frac{b}{p} + \frac{c}{p}2 + \frac{d}{p}3 + \cdots$$

where $a$, $b$, $c$, ... are constants while $p$ is a time operator.

FIELD OF THE INVENTION

The present invention relates to a DC transmission system between at least two AC networks which are asynchronously connected by means of a DC link or DC links. The transmission system is provided with a control system of conventional type for control with respect to a certain operating magnitude, such as transmitted current or power, on the like and the invention relates to the provision of an additional control system for such a DC power transmission system, so that by intervention in the control system it is possible to suppress possible ocsillations in one or more of the networks.

BACKGROUND OF THE INVENTION

It is previously known, with the help of a DC power transmission system to suppress oscillations between parts of an alternating current network or between two AC networks asynchronously connected to a DC link and the principles for this are described, for example in U.S. Pat. 3,275,838 and Swedish Pat. No. 221,104 and in the journals "Direct Current," vol. 9, No. 3, August 1964 and "Elektrizitätswirtschaft," vol. 11, June 5, 1960. Possible frequency deviations at the ends of the transmission links are used as basic reference values and in all these solutions a mutual suppression of oscillations between the connected parts is intended although one part or one network may have priority with a view to stability.

Contrary to this, the present invention relates to a way of increasing the stability within a first AC network when oscillations arise between parts of this network by influencing the control of a DC transmission system between this network and a second network (possibly several other networks and possibly several power transmission systems). According to the invention, thus, only limited consideration is given to what may happen in the second network.

The oscillations to be suppressed usually derive from disturbances which give rise to temporary or permanent dropout of loads or power machines within the network in question and appear as oscillations in the speed of the various rotating machines and the frequencies emitted by them.

It is obvious that the regulators of the various machines within the networks try to stabilise the speed, but it should be observed that these regulators, for example of water power turbines, are often so slow in relation to the oscillation frequency that in more serious cases they are unable to counteract the oscillations so that the synchronism between the various parts of the network may be lost. By the use of the invention, however, it is possible to suppress the oscillation itself so that the machine regulator need only take into account the final conditions which, with temporary disturbances, means that the machine regulators for the most part need not alter their adjustment.

SUMMARY OF THE INVENTION

As with the known systems, possible frequency deviations in the network in question are used as a basis and, for a certain connection of a DC power transmission system, two points are selected at which frequency deviations are measured. As the first point a point is always selected near the connection of the DC link whereas the second point is chosen at a suitable point, usually as far away from the first as possible. In order in a relatively simple manner to obtain a reliable measurement of a frequency deviation, rotating machines in the network are selected as measuring points and the actual speed of the machine is, suitably measured, that is the number of revolutions compared with the desired speed. The difference between these two speed values is divided by half the number of poles of the machine, thus giving a measurement for frequency deviation.

According to the invention the frequency deviation at each point is supplied to a regulator having a certain transmission function and the sum of the output signals from the two regulators is supplied to the control system of the DC link in the form of an additional control order over and above the previously existing control order for the system.

The control function for each regulator has the character $$F_x = a_x + \frac{b_x}{p} + \frac{c_x}{p^2} + \frac{d_x}{p_3} + \cdots$$

where $p$ is a time operator while $a_x$, $b_x$ etc. are constants which according to the invention should fulfill the following conditions:

$$a_1 = 0$$
$$a_1 + a_2 = 0$$
$$b_1 + b_2 = 0$$
$$c_1 + c_2 = 0$$
$$d_1 + d_2 = 0$$

etc. where the index 1 refers to said first measuring point at the connection point of the DC link and the index 2 refers to the second measuring point.

In practice the constants $c_x$, $d_x$, etc. are suitably zero so that the two regulator functions have the characters:

$$F_1 = a_1 + \frac{b_1}{p} \text{ and } F_2 = a_2 + \frac{b_2}{p}$$

In other words as the input of a regulator is $\Delta f$, the output will be $a \cdot \Delta f + b \int \Delta f$ so that the transmitted signal is composed of the actual frequency deviation and the integral of this frequency deviation so that $b_1$ and $b_2$ must always be numerically identical but have opposite signs.

Of the four constants, $a_1$ must always differ from zero, whereas $a_2$ or $b_1$ and $b_2$ may be zero. As a special case may be mentioned that $a_2 = b_1 = b_2 = 0$, which covers the known principle that the DC link is controlled with respect to the frequency at the connection point. In the known case the second measuring point has thus disappeared. According to the present invention thus, as a further condition at least one of the constants $a_2$, $b_1$ and $b_2$ must be different from zero, if the desired result is to be obtained.

That $a_1$ must differ from zero is due to the fact that consideration must always be taken in the first place of a frequency deviation at the connection point in the DC link.

$a_1+a_2$ must differ from zero to ensure that the additional control order is maintained until complete suppression is obtained. If $a_1+a_2$ were zero this would mean that the additional current order would be zero if the frequency deviation is the same in the two points, which means that the first network is left to its own control devices although its frequency possibly has not been returned to the normal value. The final choice of the exact values of $a$ and $b$ within the limits according to the invention should be made depending on the rotating masses in the different parts of the network and the demands for stability in these as will be further explained later.

BRIEF DESCRIPTION OF THE DRAWINGS

The invention will be further described with reference to the accompanying drawings where.

DESCRIPTION OF THE PREFERRED EMBODIMENTS

Figure 1:
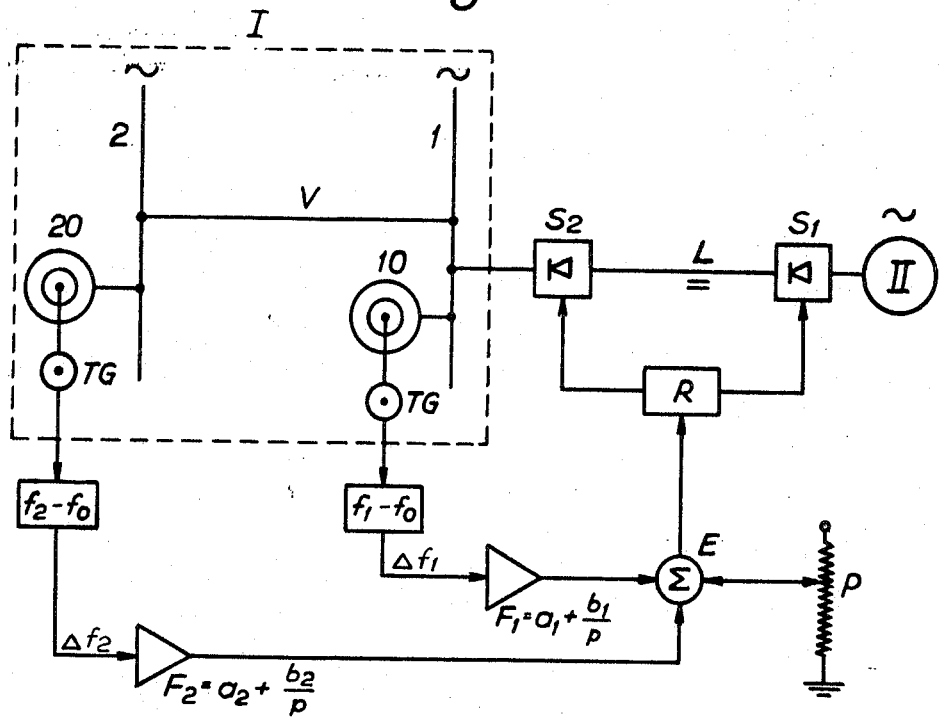
FIGS. 1–3 show various embodiments according to the invention.

FIG. 1 shows two alternating current networks I and II asynchronously connected by a DC link L comprising two converter stations S1 and S2. One of these is a rectifier and the other an inverter but it should be pointed out that it is without importance for the invention which is which, in other words, which of the networks I and II is feeding and which is fed. S1 and S2 are controlled in known manner by a common regulator R with respect to an operating magnitude, for example transmitted current, power, or the like the desired value of which is set on a potentiometer P which is connected over a summation member E to the input side of the regulator.

The network I which is to be stabilised in this example is shown as built up of two parts 1 and 2 synchronously connected over an AC link V. The measuring points according to the invention are selected as a machine 10, 20 in each of these parts and the first measuring point should be selected as the machine 10 within the network 1 which is nearest the connection point of the converter $S_2$. At the mentioned points the frequency is measured, for example by measuring the speed of the machine in question by means of a tachometer-generator TG and the deviation in the number of revolutions divided by the number of poles provides the frequency deviation $\Delta f$ at the point in question.

The frequency difference for each point is supplied to a corresponding control amplifier $F_1$, $F_2$ the transmission functions of which are indicated above. The signals from these amplifiers are supplied to the summation member E and added to the signal from the potentiometer P. The transmitted power of the DC link will therefore vary depending on the frequency deviations in the two measuring points and mathematical calculations as well as practical experiments show that the intended suppression of oscillations arising is obtained.

Regarding the choice of the various constants $a$ and $b$, it is already mentioned that this must be carried out with a view to the ratio between the powers, or rather the rotation energy, in the two network parts 1 and 2. If the power in the network 2 is large in relation to the power in the network 1 the amplitude of the frequency deviation in the network 1 will probably tend to be greater than in the network 2. In return, it is relatively easy to suppress oscillations in the network 1 since it is connected directly to the DC link. It is thus desirable for $F_1$ to exceed $F_2$, that is that the constant $a_1$ should be numerically greater than $a_2$. Further, a calculation shows that the constant $a_1$ for the network part 1 connected directly to the DC link should preferably be chosen with respect to and almost proportional to the rotation energy of this part while $a_2$ must always be chosen with respect to the relation between the rotation energy of the two network parts.

As a very simple and approximate case $a_1$ and $a_2$ could be chosen according to the equations $$a_1 = A \cdot W_1$$

$$a_2 = B \left( C - \frac{W_2}{W_1} \right) \cdot W_1$$

where A, B and C are constants while $W_1$ and $W_2$ represent the rotation energy of the network parts 1 and 2, respectively.

The relation between $a$ and $b$, on the other hand, follows the normal rules of regulation theories and thus depends on whether the actual value of a deviation or the integral of this deviation is to dominate the regulator.

It should also be mentioned that $F_1$, E, R and P are suitably arranged adjacent to the converter S2 which is arranged in the vicinity of the network 1. From here the control signal is transmitted to the converter S1 by a tele-connection. The signal from $F_2$ is also transmitted to E by a tele-link. It should be observed that it is more reliable to transmit a signal corresponding to the integral of a magnitude, in this case $\Delta f_2$, than the instantaneous value of the magnitude. It is therefore often advantageous to select $a_2=0$, in which case $b_2=-b_1$ must differ from zero.

Figure 1A:
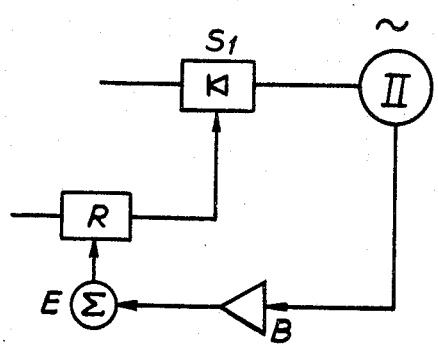
FIGS. 1a and b show details of FIG. 1.

Since suppression of possible oscillations must occur rapidly if the synchronism in the network I is not to be jeopardized, the stabilising power from the network II should preferably be taken from the rotating bodies in this network. Dependent on the rigidity of the network II, therefore, the stabilising power available is limited. If the need of stabilising power exceeds the resources of the network II it may therefore be necessary to limit the intervention from $F_1$ and $F_2$ which can be done according to FIG. 1a which shows a detail of FIG. 1. A limiting device has been connected to E in the form of an amplifier B to the input side of which is connected a magnitude from the network II, for example the deviation from normal frequency or a certain percentage of the real power in this network. If this deviation or the summation order to E exceeds that which can be permitted in the network II the alteration in the control order to the regulator R will be limited. In other words, the network II will only emit as great as stabilising power as its resources permit. It should be pointed out that the stabilising effect from the network II may be either positive or negative, that is it may consist of an increase or a decrease in the power transmitted in the DC link.

Figure 1B:
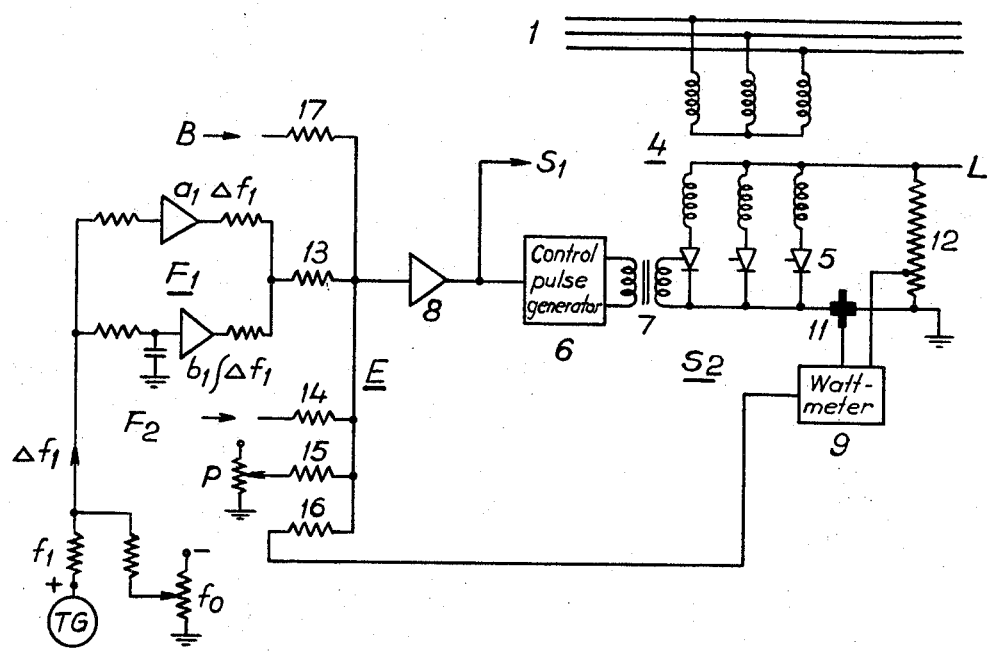

FIG. 1b shows more details of the station $S_2$ together with the further components located in this station.

$S_2$ comprises a static converter comprising a converter transformer 4 and rectifiers 5 connected thereto. One side of the converter transformer is connected to the AC line 1 while the other side is connected to the DC transmission line L and earth. The rectifiers 5 are controlled from a control pulse generator 6 through control pulse transformers 7, only one of these being shown. As mentioned in the above U.S. Pat. No. 3,275,838, the phase position of the control pulses from the generator 6 is determined from the regulator R in FIG. 1. In FIG. 1b the regulator R comprises an amplifier 8 and a wattmeter 9 connected to the amplifier over a resistor 16. The wattmeter 9 measures the actual value of the transmitted power in the DC line by means of a transducer 11 measuring the direct current and a voltage divider 12 indicating the direct voltage of the DC line L. The desired value of the transmitted power is set by means of the potentiometer P connected to the amplifier 8 over a resistor 15.

The amplifiers $F_1$ and $F_2$ are connected to the input side of amplifier 8 over further resistors 13 and 14 and the parallel connection of the input resistors 13–16 forms the summation member E in FIG. 1. Instead of parallel-connected currents the input signals to 8 could be constituted by voltages connected over series connected resistors on the input side of 8. As seen the output from 8 is connected directly to the control pulse generator 6 in station $S_2$ and to the corresponding control pulse generator in station $S_1$ over a tele-connection.

In FIG. 1b is also shown how the frequency deviation $\Delta f_1$ is derived as the difference between the actual frequency $f_1$ from the tachometer-generator T9 on the machine 10 in FIG. 1 and the nominal frequency $f_0$ set on a potentiometer. The magnitude $\Delta f_1$ is fed to the amplifier $F_1$ with the character $$a_1 + \frac{b_1}{p}$$

which could be constituted by two parallel connected amplifiers with outputs $a_1 \cdot \Delta f_1$ and $b_1 \int \Delta f_1$, respectively. The amplifier $F_2$ is made constructed in a corresponding way.

The regulator amplifier 8, common for the two stations $S_1$ and $S_2$, is fed with the summed signal from 9, P, $F_1$ and $F_2$. A further signal could be provided from the amplifier B in FIG. 1a over a resistor 17. As mentioned, the signal from B represents the deviation from the permitted frequency or transmission power in the AC network II.

Figure 2:
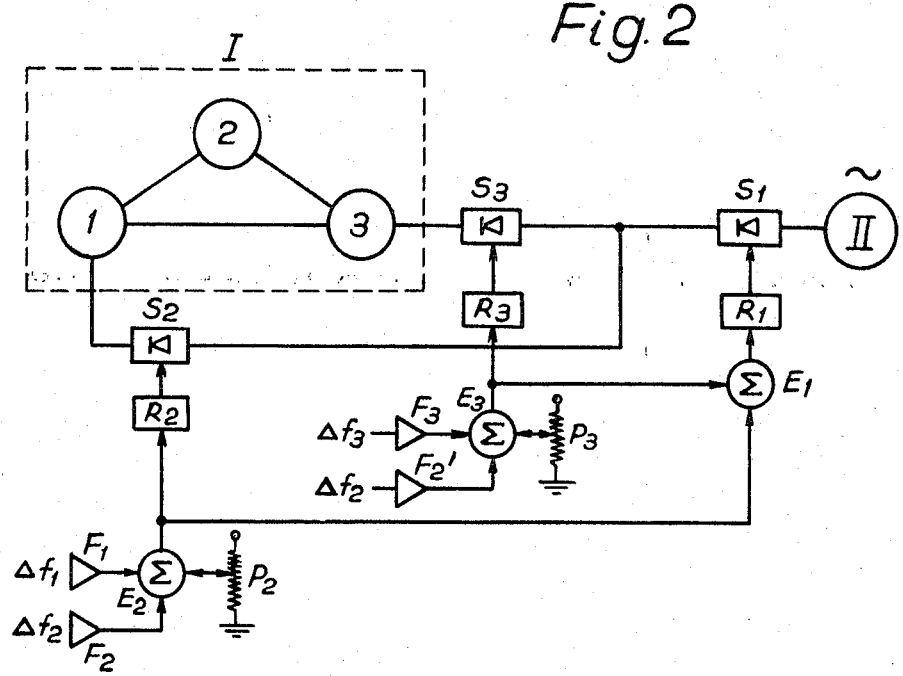

If the network I is large it may be desirable to support it at two or more points. An example of this is shown in FIG. 2 where the network I consists of three parts 1, 2 and 3. The DC link is divided into two branches, one of which is connected through the converter S2 to the part 1 and the other of which is connected through the converter S3 to the part 3. The converters S2 and S3 are controlled by the regulators R2 and R3 with desired-value emitters P2 and P3 connected through the summation members E2 and E3. The output signals from E2 and E3 are supplied to the summation member E1 of the regulator R1 for the converter S1, the resultant effect of which must be equal to the sum of the effects from S1 and S3.

For each DC connection two points are selected, the first of which is always selected within the network part, that is 1 or 3, respectively, to which the DC link is connected, whereas the other point may be selected as a common point within the part 2. To the summation member E2, therefore, two regulators F1 and F2 are connected, the input signals of which consist of the frequency deviation $\Delta f_1$ or $\Delta f_2$ in the parts 1 or 2, respectively, whereas to the member E3 are connected regulators $F_3$ and $F_2'$ fed by the frequency deviations $\Delta f_3$ and $\Delta f_2$, respectively. The regulators $F_2$, $F_2'$ thus receive the same input signal, which need not, however, mean that their transmission functions contain the same constants.

Figure 3:
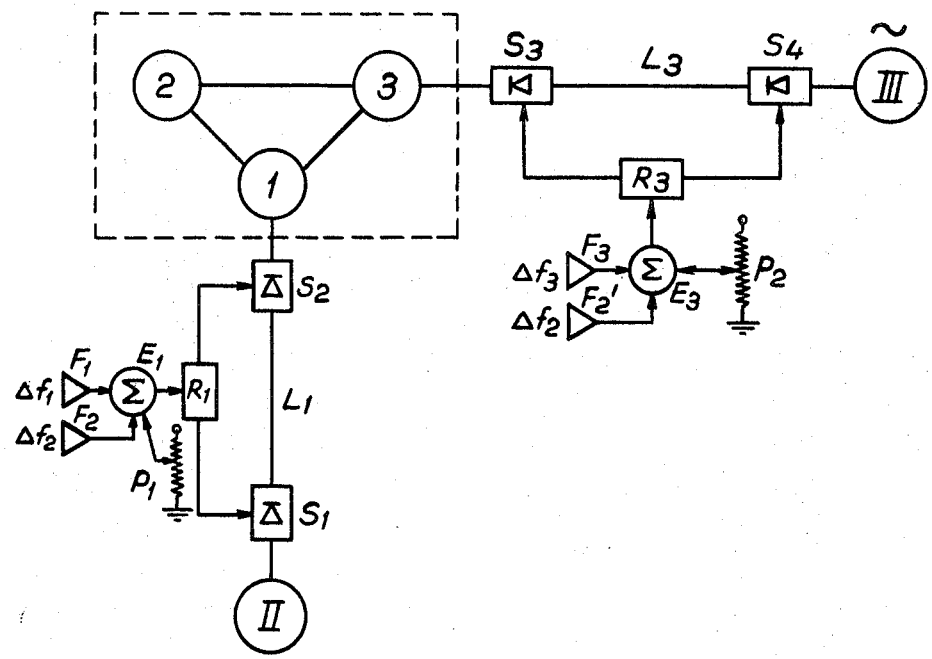

FIG. 3 shows a third example where the network I is connected to two other AC networks II and III by DC links L1 and L3. As in accordance with FIG. 2, two regulators $F_1$, $F_2$ and $F_3$, $F_2'$, respectively, are connected to each of the summation members E1 and E3, so that each DC link obtains an additional control order dependent on the frequency deviations at two points in the network I.

The networks II and II may possibly be synchronously connected by an AC link and comprise a combined network so that a variation of FIG. 2 is obtained with two separate DC connections instead of a branched connection as in accordance with FIG. 2.

I claim:

1. DC power transmission system between at least two AC networks, which transmission system is controlled by means of a first control order with respect to a certain operating magnitude, in which means are provided to form a second control order comprising the sum of two signals each derived from a possible frequency deviation at first and second points in a first of said networks, the first of said points being in the vicinity of the DC connection terminal to said network and the second point being at a distance therefrom, said second control order forming means comprising regulator means for deriving signals from said frequency deviations, said regulator means having a transmission function with the character $$F = a + \frac{b}{p} + \frac{c}{p}2 + \frac{d}{p}3$$

where $p$ is a time operator and where for the regulator of the first point the constant "$a_1$" and for the regulators of both the points the sum $a_1 + a_2$ differs from zero and at the same time the sums of each of the two "$bs$, $cs$ and $ds$" etc. of the two regulator functions is always zero and further that at least one of the constants $a_2$, $b_1$ and $b_2$ differs from zero.

2. DC power transmission system according to claim 1, in which the constants $c$, $d$ and all further constants are all zero for the two regulator means.

3. DC power transmission according to claim 2, in which the constant $b$ is zero for both regulator means.

4. DC power transmission system according to claim 1, in which the constant $a$ is zero for the regulator connected to the second of said points.

5. DC power transmission system according to claim 1, in which means is provided to limit the magnitude of said second control order in relation to an operating magnitude in the second of said AC networks.

6. DC power transmission system according to claim 1, where DC power transmission systems are connected to said first network at several points, in which for each such connection point a corresponding additional control order is derived for the corresponding DC power transmission system.

7. DC power transmission system according to claim 1, in which rotating machines in said first network constitute said measuring points, and said means to form a second control order comprises means for measuring deviations in speed of said rotating machines.

References Cited

UNITED STATES PATENTS 3,275,838   9/1966   Almström _____ 307—20 X

ROBERT K. SCHAEFER, Primary Examiner

H. J. HOFAUSER, Assistant Examiner